United States Patent [19]
Berry et al.

[11] 3,918,421
[45] Nov. 11, 1975

[54] INDUCTION AIR TEMPERATURE CONTROL APPARATUS

[75] Inventors: Thomas G. Berry, Dearborn; Vincent L. Fyie, Ferndale, both of Mich.

[73] Assignee: Ford Motor Company, Dearborn, Mich.

[22] Filed: Mar. 1, 1974

[21] Appl. No.: 447,450

[52] U.S. Cl. .......................... 123/122 D; 123/122 H
[51] Int. Cl.² ........................................ F02M 31/00
[58] Field of Search .................... 123/122 D, 122 H

[56] References Cited
UNITED STATES PATENTS

| 3,394,687 | 7/1968 | Scott | 123/122 D |
| 3,444,671 | 5/1969 | Florine | 123/122 D |
| 3,744,716 | 7/1973 | Charles | 123/122 D |
| 3,801,078 | 4/1974 | Denton | 123/122 H |
| 3,830,210 | 8/1974 | Muller | 123/122 D |

Primary Examiner—Charles J. Myhre
Assistant Examiner—R. H. Lazarus
Attorney, Agent, or Firm—Roger E. Erickson; Keith L. Zerschling

[57] ABSTRACT

Apparatus for controlling the temperature of the induction air of an internal combustion engine. The apparatus includes a flap valve movable to vary the ratio of heated air to ambient air. The flap valve is controlled by a vacuum motor connected to a source of intake manifold vacuum. The invention includes a temperature responsive means that maintains the flap valve in a full-heat or partial heat position when the engine is cold irrespective of a sudden decay in intake manifold vacuum.

7 Claims, 3 Drawing Figures

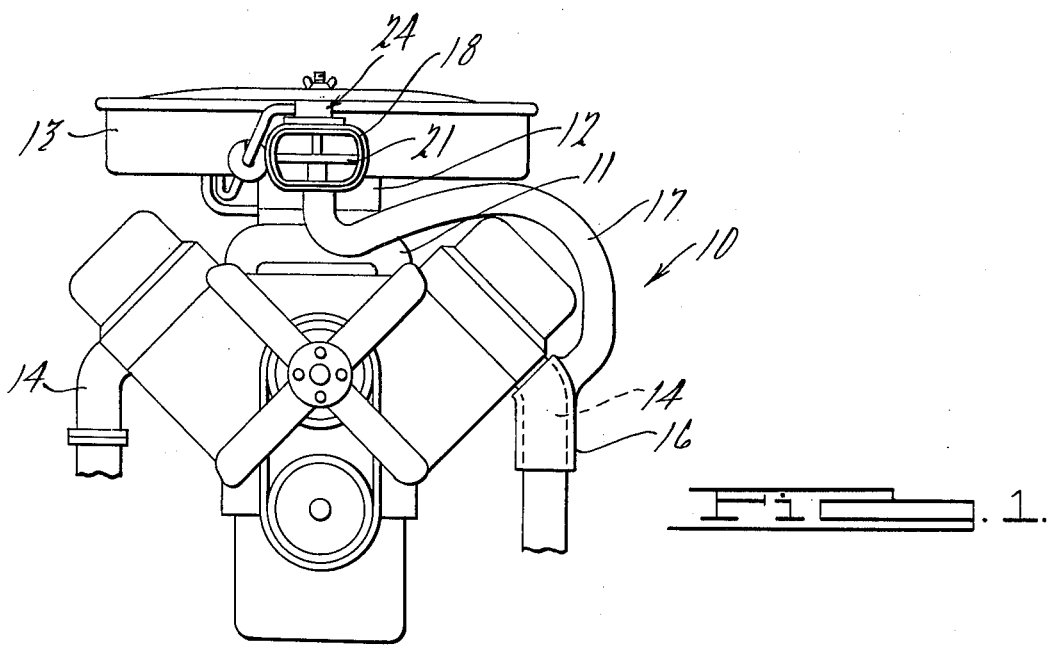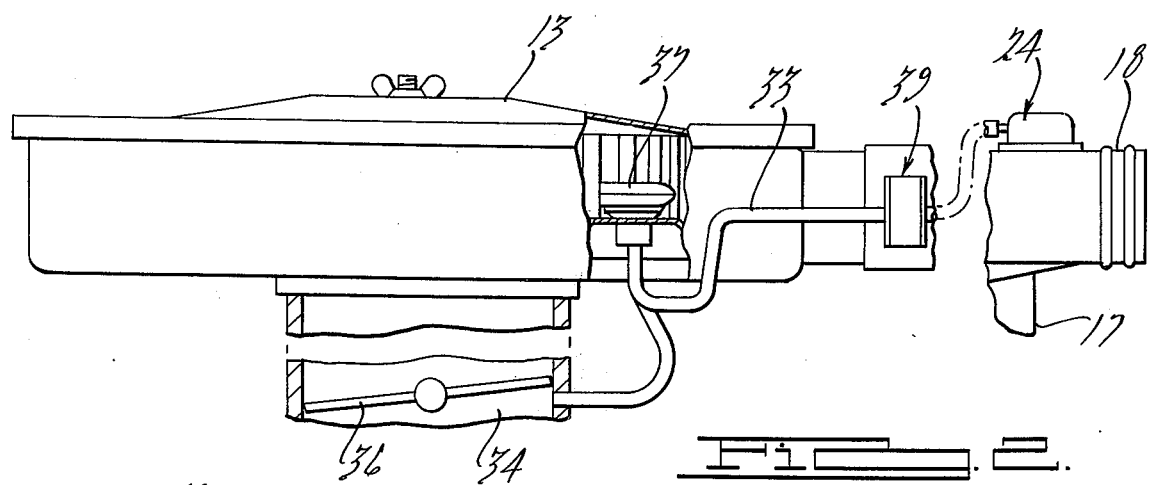

INDUCTION AIR TEMPERATURE CONTROL APPARATUS

BACKGROUND AND SUMMARY OF THE INVENTION

It has long been recognized that the fuel economy of an internal combustion engine can be improved by heating the induction air provided to the carburetor during cold or warm-up operation. The heated air results in more complete vaporization of the fuel, more efficient combustion and decreased engine emissions. Heated air is generally provided by drawing the intake air over and about the exhaust manifold to utilize its heat to warm the induction air. A second air inlet is generally located to draw ambient air either from within the engine compartment or from the outside the engine compartment. In presently known systems, the flap valve proportions the flow of heated air and/or ambient air. In some systems the flap valve is directly connected to a temperature sensitive motor such as a wax pellet. The wax pellet motor senses the temperature of the air enroute to the carburetor and positions the flap valve to increase or decrease the quantity of heated air. Usually a wax pellet motor or other temperature sensitive motor means of sufficient power to accomplish the task of moving such a flap valve is large and expensive. Consequently, the most commonly used means of positioning the flap valve in relation to induction air temperature is a vacuum motor connected to a source of intake manifold vacuum.

It is well known in the art to provide a thermostatically controlled air bleed device in the vacuum line between the source of intake manifold vacuum and the vacuum motor that operates the flap valve. The device progressively bleeds atmospheric air into the vacuum line as the induction air warms thereby permitting the vacuum motor to position the flap valve to provide an increasing proportion of ambient air and a decreasing proportion of heated air. One disadvantage of using the intake manifold as a source of vacuum to operate the vacuum motor is that its vacuum pressure is not constant. Consequently, a sudden acceleration that causes the magnitude of vacuum within the intake manifold to drop suddenly gives a signal to the vacuum motor similar to that received when the engine has achieved a warmed condition. The flap valve then prematurely closes the heated air duct.

This invention provides an induction air temperature control system that overcomes the problem of premature valve closing in response to a sudden engine acceleration. This invention also provides an induction air temperature control system that improves the driving performance of the vehicle and provides more economical operation.

Intake air temperature control apparatus constructed in accordance with this invention includes a pair of air inlet ducts of which the first duct opens to a source of ambient air and the second duct opens to a source of heated air. Each of the ducts discharges into a common induction passage leading to the engine carburetor. A flap valve is movable to open and close the first and second ducts so as to provide the carburetor with heated air or ambient air or a mixture of the two. A vacuum motor positions the flap valve to move the valve in response to an intake manifold vacuum signal. A passage or line interconnects the vacuum motor and the source of intake manifold vacuum. A temperature sensitive air bleed means is positioned in the vacuum line and is openable in response to changes in temperature to bleed atmospheric air and reduce the magnitude of the signal to the vacuum motor. A temperature sensitive valve also is positioned in the vacuum line between the air bleed means and the vacuum motor and opens and closes the vacuum line in response to changes in temperature. The temperature sensitive valve is closed when the sensed temperature is below a predetermined magnitude. A check valve is located in the vacuum line between the air bleed means and the vacuum motor in parallel with the temperature sensitive valve.

BRIEF DESCRIPTION OF THE DRAWINGS

FIG. 1 is a front elevational view of an internal combustion engine incorporating the invention.

FIG 2 is a side elevational view with portions broken away of an air cleaner positioned upon the engine carburetor.

FIG. 3 is an enlarged cross sectional view of some of the elements of FIG. 2.

DETAILED DESCRIPTION OF THE PREFERRED EMBODIMENT

In FIG. 1 of the drawings is an engine 10 having an intake manifold 11, a carburetor 12, an air cleaner assembly 13 positioned on the carburetor, an exhaust manifold 14 receiving burned gases from the engine combustion chambers, a heat stove 16 enclosing a portion of one of the exhaust manifolds and a flexible duct 17 interconnecting the heat stove and the air cleaner. Air is provided to the engine carburetor to the air cleaner through either an inlet 18 or the duct 17, or both. The inlet 18 draws ambient air from within or outside the engine compartment while the duct 17 draws heated air from adjacent the exhaust manifold.

FIGS. 2 and 3 illustrate in greater detail the induction air temperature control apparatus. A flap valve 19 is pivotable about a rod 21 and movable from the extreme upward position shown in FIG. 3 to an extreme downward position in which the portion 22 of the valve completely blocks the outlet 23 of the hot air duct 17. The flap valve is connected to a vacuum motor 24 by link 26. The vacuum motor includes a vacuum chamber 27, an atmospheric chamber 28 and a flexible diaphragm 29 separating the two chambers. A compression coil spring 31 acts against the diaphragm reinforcement 32 urging the connecting link 26 downwardly and tending to close the heated air duct outlet 23. When the vacuum motor experiences an increase in vacuum signal, the diaphragm moves upwardly against the resistance of the coil spring and flap valve moves toward the position as shown in FIG. 3 in which the induction air is drawn substantially entirely through the heated air duct 17. When the vacuum signal is reduced the force of the compressed spring urges the diaphragm downwardly so that the flap valve closes the heated air duct and provides an increased proportion of air from the ambient air inlet 18.

The vacuum motor 24 is connected by vacuum line 33 to a source of intake manifold vacuum 34 such as beneath the throttle plate 36 of the carburetor. The signal to the vacuum motor is modulated by two elements or devices positioned in series in the vacuum line. The first device is a bimetal sensor 37 which is mounted in the base of the air cleaner body as shown in FIG. 2. The bimetal sensor may be one of many well known designs such as that shown in U.S. Pat. No. 3,459,163, granted to Lewis on Aug. 5, 1969. The bimetal sensor functions as a segment of the vacuum line 33 having an air bleed orifice 38 which opens in response to an increase in temperature within the air cleaner. Atmospheric air enters the vacuum line in a controlled manner so as to progressively reduce the magnitude of the vacuum signal as the induction air temperatures increase.

The second element in the vacuum line is a cold weather modulator valve assembly 39 located between the bimetal sensor 37 and the vacuum motor 24. The valve assembly includes two principal elements, a resilient umbrella-type check valve 41 of the type shown in U.S. Pat. No. 3,606,871 issued to Gropp et al. on Sept. 21, 1971 and a temperature sensitive, bimetal disc valve 42. The umbrella valve and the temperature sensitive valve function in parallel. The cold weather modulator valve assembly includes a plastic housing 43, a compression spring 44 bearing against one wall of the housing and against the bimetal disc to hold it in place against support elements 46 of the housing. The elements are separated by grooves or voids to permit generally unrestricted flow of air around the bimetal disc 42. An O-ring 47 is positioned within a small recess in the wall and is engageable with a side of the bimetal disc to seal the modulator valve and block the vacuum line 33 when the temperature of the modulator valve environment is below a predetermined magnitude. The umbrella-type check valve 41 is centrally mounted on the bimetal disc. A plurality of holes 48 are formed in the bimetal disc within the circumference of the umbrella valve to provide communication through the valve assembly when the vacuum pressure differential across the valve assembly exceeds a predetermined magnitude.

OPERATION

The basic function of the induction air temperature control apparatus described above is to heat the induction air during engine warm-up and to regulate the temperature during continued operation. This is accomplished by having two separate sources of induction air. The first source is the region about the exhaust manifold 14 and consequently, the air drawn therefrom is heated to a temperature greater than that of ambient air. The second source of induction air is the ambient air surrounding either the vehicle or the engine. If the ambient air is drawn from outside the vehicle, a duct connects the inlet pipe 18 to a register (not shown) opening to the exterior of the vehicle. The flap valve 19 is movable from one extreme position to another to provide either heated air, ambient air or a mixture. The flap valve is positioned by a vacuum motor 24. Vacuum line 33 interconnects the vacuum chamber 29 of the vacuum motor with a source of intake manifold 34 e.g., in the carburetor or the carburetor spacer immediately beneath the throttle plate 36 as shown in FIG. 2. As the vacuum signal to the vacuum motor increases, the flexible diaphragm 29 is drawn upwardly against the force of compression spring 31 and the flap valve moves toward a full-heat position as shown in FIG. 3. Conversely, as the magnitude of the vacuum signal decreases the diaphragm moves downwardly and the flap valve moves toward a horizontal position in which only ambient air is drawn.

The air bleed orifice 38 of the bimetal sensor 37 is closed at induction air temperatures below a predetermined magnitude. As the temperatures rise above the predetermined magnitude, the bimetal element 49 progressively opens the air bleed orifice and the vacuum signal is reduced accordingly. As the vacuum signal experienced by the vacuum motor decreases, the spring 31 dominates and moves the flap valve from the full-heat position of FIG. 3 toward a full-ambient, horizontal position.

The cold weather modulator valve assembly 39 is a combination check valve and temperature sensitive valve that prevents the movement of the flap valve 19 from a full or part heat position to the full ambient, horizontal position (1) when a drop in intake manifold vacuum occurs resulting from an increased load or rapid acceleration and (2) while the air temperature adjacent the air cleaner indicates that the side of the air cleaner inlet downstream of the flap valve as shown in FIG. 2. When the temperature sensed by the modulator valve is below a predetermined magnitude, the bimetal disc 42 bears against the O-ring 47 to form a seal blocking the vacuum line 33 between the vacuum motor 24 and the bimetal sensor 37. With the bimetal disc sealing against the O-ring a high vacuum within the intake manifold, as is experienced during engine idling or at low vehicle speed, is communicated to the vacuum motor past the umbrella element 41 which is lifted from sealing engagement against a side of the bimetal disc 42 by the pressure differential existing across the modulator valve thus providing communication through the holes 48 in the disc 42. Thus, when the engine of a motor vehicle is started under cold conditions the high magnitude vacuum will be communicated to the vacuum motor and the flap valve will be drawn up into the full-heat position as shown in FIG. 3 of the drawings. If sudden acceleration occurs the drop in intake manifold vacuum creates an opposite pressure differential across the modulator valve which reinforces the closure of the umbrella valve against the bimetal disc 42 and the seal between the bimetal disc 42 and the O-ring 47. Consequently, during a cold acceleration the vacuum motor will not experience a decay in vacuum signal corresponding to the drop in vacuum in the intake manifold. It may be seen that the movement of the flap valve from full-heat to full-ambient position which normally occurs in conventional systems during cold accelerations will be prevented.

Modifications and alterations will occur to those skilled in the art which are included within the scope of the following claims.

We claim:

1. Apparatus to regulate the intake air temperature of an internal combustion engine,
   said engine including an intake manifold and a carburetor in communication with said intake manifold,
   said apparatus including first and second air inlet conduits, said first conduit opening to a source of ambient air, said second conduit opening to a source of heated air, means communicating each said conduit with said carburetor, valve means movable to open and close said first and second conduits so as to provide said carburetor with heated air or ambient air or a mixture of heated and ambient air, a vacuum motor connected to said valve means to move said valve means in response to a vacuum signal, a vacuum passage communicating said vacuum motor and a source of intake manifold vacuum, a temperature sensitive air bleed means positioned in said vacuum passage, said air bleed means being openable in response to changes in temperature to reduce the vacuum signal to the vacuum motor, a temperature sensitive valve positioned in line in said vacuum passage between said air bleed means and said vacuum motor to open and close said vacuum passage in response to changes in temperature, said temperature sensitive valve being closed when the sensed temperature is below a predetermined magnitude, and a check valve positioned in line in said vacuum passage between said air bleed means and said vacuum motor and in parallel with said temperature sensitive valve.

2. Apparatus according to claim 1, said check valve (permitting the relief of a pressure differential in one direction only) so that an increasing intake manifold vacuum signal is communicated from the source of intake manifold vacuum to the vacuum motor.

3. Apparatus to control the intake air temperature of an internal combustion engine, said engine including an intake manifold, a carburetor discharging into said intake manifold, an air cleaner filtering the air to be received by said carburetor and an exhaust manifold, said apparatus including first and second conduit means to deliver air to said air cleaner, said first conduit having an inlet opening adjacent the exhaust manifold and drawing heated air from about said exhaust manifold, said second conduit having an inlet opening at a position remote from exhaust manifold, flap valve means movable to open and close said conduits, a vacuum motor connected to said flap valve means to move said valve means in response to a vacuum signal, passage means interconnecting said vacuum motor and a source of intake manifold vacuum, a first bimetal valve positioned in said passage means having an element movable in response to induction air temperature changes to open and close a vacuum bleed to atmosphere, a resilient check valve positioned in said passage means between said first bimetal valve and said vacuum motor, a second bimetal valve positioned in said passage means between said sensor and said vacuum motor and in parallel with said check valve to provide a by-pass therearound, said second bimetal valve opening said passage means when its sensed temperature is above a predetermined magnitude, said first bimetal valve opening in response to an increase in induction air temperature to bleed atmospheric air into said passage means and through said check valve, and thereby to reduce the magnitude of the vacuum signal experienced by the vacuum motor, said reduction in vacuum signal tending to position said flap valve means to reduce the ratio of heated air to ambient air, said check valve permitting relief of a pressure differential in a direction so that only an increasing intake manifold vacuum signal is communicable from the source of intake manifold vacuum to the vacuum motor with said by-pass second bimetal valve closed position.

4. Apparatus to control the intake air temperature of an internal combustion engine, said engine including an intake manifold, a carburetor discharging into the intake manifold, an air cleaner supplying air to the carburetor and an exhaust manifold, said air cleaner including a main housing, and first air intake duct in communication with a source of ambient air and discharging into said main housing, a second air intake duct drawing heated air from adjacent the exhaust manifold and discharging into said first duct, a flap valve positioned at the junction of said first and second ducts and being movable to open and close said first and second ducts and to provide said carburetor with heated air from said second duct or ambient air from said first duct or a mixture of ambient and heated air, a vacuum motor connected to said flap valve to open said flap valve in response to an increase in vacuum pressure, a vacuum line in communication with said vacuum motor and a source of intake manifold vacuum, a temperature sensitive air bleed means positioned in said vacuum line, said air bleed means being openable in response to an increase in induction air temperature within said air cleaner to restrictively bleed air from within said air cleaner into said vacuum line thereby reducing the magnitude of the vacuum pressure in said vacuum line, a modulator positioned in said vacuum line between said air bleed means and said vacuum motor, said modulator including a temperature sensitive by-pass valve adapted to block said vacuum line when the temperature drops below a predetermined magnitude and a normally closed resilient check valve in said vacuum line in parallel with said by-pass valve, said check valve being openable when said by-pass valve is blocking the vacuum line in response to a predetermined vacuum differential across said check valve, said check valve upon being opened permitting an increase in vacuum pressure within said vacuum motor.

5. An improvement in apparatus to control the intake air temperature of an internal combustion engine that includes an intake manifold, a carburetor discharging into said intake manifold, an air cleaner filtering the air to be received by said carburetor and an exhaust, said apparatus also including first and second conduit means to deliver air to said air cleaner, said first conduit having an inlet opening adjacent the exhaust manifold and drawing heated air from about said exhaust manifold, said second conduit having an inlet opening at a position remote from exhaust manifold, flap valve means movable to open and close said conduits, a vacuum motor connected to said flap valve means to move said valve means in response to a vacuum signal, passage means interconnecting said vacuum motor and a source of intake manifold vacuum, a first bimetal valve positioned in said passage means having an element movable in response to induction air temperature changes to open and close a vacuum bleed to atmosphere, said improvement comprising a check valve positioned in said passage means between said first bimetal valve and said vacuum motor, a second bimetal valve positioned in said passage means between said sensor and said vacuum motor and in parallel with said check valve, said second bimetal valve closing said passage means when its sensed temperature is below a predetermined magnitude.

6. An improvement in apparatus to control the intake air temperature of an internal combustion engine, said engine including an intake manifold, a carburetor discharging into said intake manifold, an air cleaner filtering the air to be received by said carburetor and an exhaust manifold, said apparatus also including first and second conduit means to deliver air to said air cleaner, said first conduit having an inlet opening adjacent the exhaust manifold and drawing heated air from about said exhaust manifold, said second conduit having an inlet opening at a position remote from exhaust manifold, flap valve means movable to open and close said conduits, a vacuum motor connected to said flap valve means to move said valve means in response to a vacuum signal, passage means interconnecting said vacuum motor and a source of intake manifold vacuum, a first bimetal valve positioned in said passage means having an element movable in response to induction air temperature changes to open and close a vacuum bleed to atmosphere, said improvement comprising a cold weather modulator valve assembly positioned in said passage means between the first bimetal valve and the vacuum motor, said modulator valve assembly including a housing having an inlet at one end and an outlet at the other, a bimetal disc received within said housing, seal means positioned about said outlet, said bimetal disc having one side engaging said seal to block said passage means when the temperature within said housing is below a predetermined temperature, said bimetal disc flexing to a non-seal engaging position above said predetermined temperature, one or more openings formed in said bimetal disc, a resilient umbrella-type check valve mounted on said bimetal disc on the side opposite that engageable with the seal means, said check valve normally overlying said openings to close the latter, said check valve being openable when the bimetal disc is in sealing engagement with said seal means to permit the communication of a high vacuum signal in the intake manifold to the vacuum motor, said check valve closing to prevent the sudden decay of a high vacuum signal in the vacuum motor when such a decay occurs in the intake manifold.

7. An improvement in apparatus to control the intake air temperature of an internal combustion engine that includes an intake manifold, a carburetor discharging into said intake manifold, an air cleaner filtering the air to be received by said carburetor and an exhaust, said apparatus also including first and second conduit means to deliver air to said air cleaner, said first conduit having an inlet opening adjacent the exhaust manifold and drawing heated air from about said exhaust manifold, said second conduit having an inlet opening at a position remote from exhaust manifold, flap valve means movable to open and close said conduits, a vacuum motor connected to said flap valve means to move said valve means in response to a vacuum signal, passage means interconnecting said vacuum motor and a source of intake manifold vacuum, and a first bimetal valve positioned in said passage means having an element movable in response to induction air temperature changes to open and close a vacuum bleed to atmosphere, said improvement comprising a second temperature sensitive bimetal valve positioned in said passage means between said sensor and said vacuum motor, a normally closed check valve positioned in said passage means in parallel with said second bimetal valve and being openable in response to a vacuum pressure differential acting thereon corresponding to a high manifold vacuum when the second bimetal valve is in a closed condition, said second bimetal valve closing said passage means when its sensed temperature is below a predetermined magnitude.

* * * * *